United States Patent
Han et al.

(10) Patent No.: US 7,043,122 B2
(45) Date of Patent: *May 9, 2006

(54) PMD COMPENSATOR BASED ON SEPARATION OF PRINCIPAL STATE OF POLARIZATION CONTROL AND DIFFERENTIAL GROUP DELAY CONTROL, AND METHOD THEREOF

(75) Inventors: Ki Ho Han, Busan (KR); Moo Jung Chu, Daejeon (KR)

(73) Assignee: Electronics and Telecommunications Research Institute, (KR)

( * ) Notice: Subject to any disclaimer, the term of this patent is extended or adjusted under 35 U.S.C. 154(b) by 153 days.

This patent is subject to a terminal disclaimer.

(21) Appl. No.: 10/699,292

(22) Filed: Oct. 30, 2003

(65) Prior Publication Data

US 2004/0109220 A1  Jun. 10, 2004

(30) Foreign Application Priority Data

Dec. 10, 2002 (KR) ........................ 10-2002-0078146

(51) Int. Cl.
*G02B 6/26* (2006.01)
(52) U.S. Cl. .................... 385/37; 385/11; 398/102; 398/161
(58) Field of Classification Search ............. 385/11, 385/28, 37; 398/102, 150, 161
See application file for complete search history.

(56) References Cited

U.S. PATENT DOCUMENTS

| 5,930,414 A | 7/1999 | Fishman et al. |
| 6,271,952 B1 | 8/2001 | Epworth |
| 6,678,431 B1 * | 1/2004 | Han et al. .................. 385/11 |

OTHER PUBLICATIONS

IEEE Photonics Technology Letters, vol. 9, No. 1, Jan. 1997, pp. 121-123.

* cited by examiner

*Primary Examiner*—Michelle Connelly-Cushwa
*Assistant Examiner*—Jerry T Rahll
(74) *Attorney, Agent, or Firm*—Blakely Sokoloff Taylor & Zafman (57) ABSTRACT

Provided are a polarization mode dispersion (PMD) compensator and method for automatically and rapidly compensating PMD occurring in an optical transmission fiber in a high-speed optical transmission system. The polarization mode dispersion compensator includes a separator and a differential time delay remover. The separator aligns orthogonal first and second polarization components of a received optical signal with respect to two orthogonal axes of a polarization beam splitter using optical signal information output via a second path of a first path and the second path of the two outputs of the polarization beam splitter, splits the first and second polarization components, and transmits the first polarization component via the first path and the second polarization component via the second path. The differential time delay remover receives the first and second polarization components that have been split to remove a differential time delay between the first and second polarization components.

18 Claims, 9 Drawing Sheets

PMD COMPENSATOR BASED ON SEPARATION OF PRINCIPAL STATE OF POLARIZATION CONTROL AND DIFFERENTIAL GROUP DELAY CONTROL, AND METHOD THEREOF

BACKGROUND OF THE INVENTION

This application claims the priority of Korean Patent Application No. 2002-78146, filed on Dec. 10, 2002, in the Korean Intellectual Property Office, the disclosure of which is incorporated herein in its entirety by reference.

1. Field of the Invention

The present invention relates to a polarization mode dispersion (PMD) compensator for automatically and rapidly compensating PMD occurring in an optical transmission fiber in a high-speed optical transmission system, and a PMD compensating method.

2. Description of the Related Art

Since pulse dispersion occurring in optical transmission fibers limits a transmission bandwidth and a transmission distance, it is an obstacle to develop high-capacity, long-haul optical communication systems. Chromatic dispersion and PMD are main causes of such pulse dispersion. Since chromatic dispersion is predetermined and does not vary with time, color dispersion can be completely compensated for. PMD has statistical characteristics resulting from birefringence and random polarization mode coupling appearing in an optical transmission fiber due to internal and external factors and varies with time. Accordingly, a fast real-time automatic adaptive compensator faster than the variation speed of PMD is required to compensate for PMD.

The main principle of a PMD compensator is to adjust two orthogonal principal states of polarization (PSP) in an optical transmission fiber and a differential group delay (DGD) between the two PSP using a polarization controller and a time delay line controller to remove a differential time delay between the two PSP. Examples employing such a principle of compensating PMD are disclosed as follows.

A PMD compensation method is disclosed in the article entitled "Polarization Mode Dispersion Compensation by Phase Diversity Detection" by B. W. Hakki and published in IEEE Photonics Technology Letters, vol 9, pp. 121–123, 1997. In this disclosed method, a compensator finds a differential time delay between two PSP from two mixers and applies a time delay having the same size as and an opposite direction to the differential time delay to a variable delay line in order to compensate for PMD. Here, electric signals input to the two mixers should be equal regardless of a variation in the magnitude of optical power of the two PSP. A separate high-speed automatic gain control (AGC) circuit is necessary for this. As a result, an additional high-priced, high-speed sophisticated circuitry as well as mixers is needed as a bit rate increases.

R. Noe et al. revealed the article entitled "Polarization Mode Dispersing Compensation at 20 Gib/s with Fiber-based Distributed Equalizer" and published in Electronics Letters, vol. 34, pp. 2421–2422, 1998. In this article, polarization transformers located among several pieces of polarization maintaining fiber (PMF) are controlled from linear combinations of power components of several specific electric frequencies to eliminate a differential time delay between two orthogonal polarizations due to PMD. Accordingly, this method has disadvantages in that compensation for PMD takes a long time and control of a time delay is discontinuous due to the adjustment of several polarization transformers.

U.S. Pat. No. 5,930,414 discloses "Method and Apparatus for Automatic Compensation of First-Order Polarization Mode Dispersion (PMD)" in which a Mach-Zehnder interferometer type compensator integrates an electrical spectrum output therefrom and one controller monitors the integrated value to alternately feed an optical delay line and a polarization transformer back in order to compensate for a differential time delay due to PMD. In this method, all polarization states have to be changed by adjusting the polarization transformer to each delay value given by the optical delay line to find a maximum integration value of the electrical spectrum. Thus, compensation for PMD takes a long time.

SUMMARY OF THE INVENTION

The present invention provides a PMD compensator and compensating method by which fast compensation can be achieved by controlling PSP separately from DGD to considerably reduce compensation time for PMD, and simultaneously, to automatically adapt to PMD varying with time.

According to an aspect of the present invention, there is provided a polarization mode dispersion compensator including a separator and a differential time delay remover. The separator aligns orthogonal first and second polarization components of a received optical signal with respect to two orthogonal axes of a polarization beam splitter using optical signal information output via a second path of a first path and the second path of the two outputs of the polarization beam splitter, splits the first and second polarization components, and transmits the first polarization component via the first path and the second polarization component via the second path. The differential time delay remover receives the first and second polarization components that have been split to remove a differential time delay between the first and second polarization components.

The separator includes a polarization controller (PC), a first polarization beam splitter, a first optical tap, a photodetector, a band-pass filter, and a PC controller. The polarization controller (PC) transforms principal states of polarization of the optical signal received via an optical transmission fiber. The first polarization beam splitter splits the transformed optical signal into orthogonal first and second polarization components, and transmits an optical signal of the first optical signal via the first path and an optical signal of the second optical signal via the second path. The first optical tap receives the second optical signal via the second path, diverges a portion of the second optical signal, and transmits the remaining portion of the second optical signal. The photodetector converts the optical signal diverged by the first optical tap into an electric signal. The band-pass filter filters a particular frequency component of an electrical spectrum of the electric signal. The PC controller controls the PC using a power value of the filtered frequency component so that the first and second polarization components of the received optical signal are aligned with respect to two axes of the first polarization beam splitter, the first polarization component is transmitted via the first path, and the second polarization component is transmitted via the second path.

The differential time delay remover includes a variable delay line, a second polarization beam splitter, a second optical-tap, and a delay line controller. The variable delay line receives the optical signal of the first polarization component diverged by the first polarization beam splitter and then variably introduces a time delay to the optical signal of the first polarization component. The second polarization beam splitter couples and outputs the optical signal of the first polarization component and the optical signal of the second polarization component transmitted through the first optical tap. The second optical tap diverges a portion of the coupled optical signal output from the second polarization beam splitter and transmits the remaining portion of the coupled optical signal. The delay line controller controls the variable delay line so as to remove the differential time delay between the first and second polarization components using the optical signal diverged by the second optical tap.

The separator may include a circulator, a PC, a polarization beam splitter, a PSP monitoring unit, and a PC controller. The circulator circulates the optical signal received via the optical transmission fiber. The PC transforms principle states of polarization of the optical signal output from the circulator. The polarization beam splitter splits the transformed optical signal into orthogonal first and second polarization components, and transmits an optical signal of the first polarization component via the first path and an optical signal of the second polarization component via the second path. The PSP monitoring unit receives the optical signal via the second path, reflects a portion of the optical signal, and transmits the remaining portion of the optical to monitor an electrical power of the transmitted portion of the optical signal. The PC controller controls the PC using the calculated power value so that the first and second polarization components are aligned with respect to two orthogonal axes of the polarization beam splitter, the first polarization component is transmitted via the first path, and the second polarization component is transmitted via the second path.

The differential time delay remover may include a variable delay line, a mirror, an optical tap, and a delay line controller. The variable delay line receives the optical signal of the first polarization component output from the polarization beam splitter and then variably introduces a time delay to the optical signal of the first polarization component. The mirror reflects the optical signal of the first polarization component. The optical tap diverges the coupled optical signal which is obtained by coupling the optical signal of the first polarization component reflected from the mirror to the optical signal of the second polarization component reflected from the PSP monitoring unit using the polarization beam splitter and transmitting the coupled optical signal through the PC and the circulator. The delay line controller controls the variable delay line using the optical signal diverged by the optical tap to remove a differential time delay between the first and second polarization components.

According to another aspect of the present invention, there is provided a method of compensating for polarization mode dispersion. Orthogonal first and second polarization components of a received optical signal are aligned with respect to two orthogonal axes of a polarization beam splitter using optical signal information output via a second path of a first path and the second path of the two outputs of the polarization beam splitter, the first and second polarization components are split, the first polarization component is transmitted via the first path, and the second polarization component is transmitted via the second path. The first and second polarization components that have been split are received to remove a differential time delay between the first and second polarization components.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, preferred embodiments of the present invention will be described in detail with reference to the attached drawings.

Figure 1:
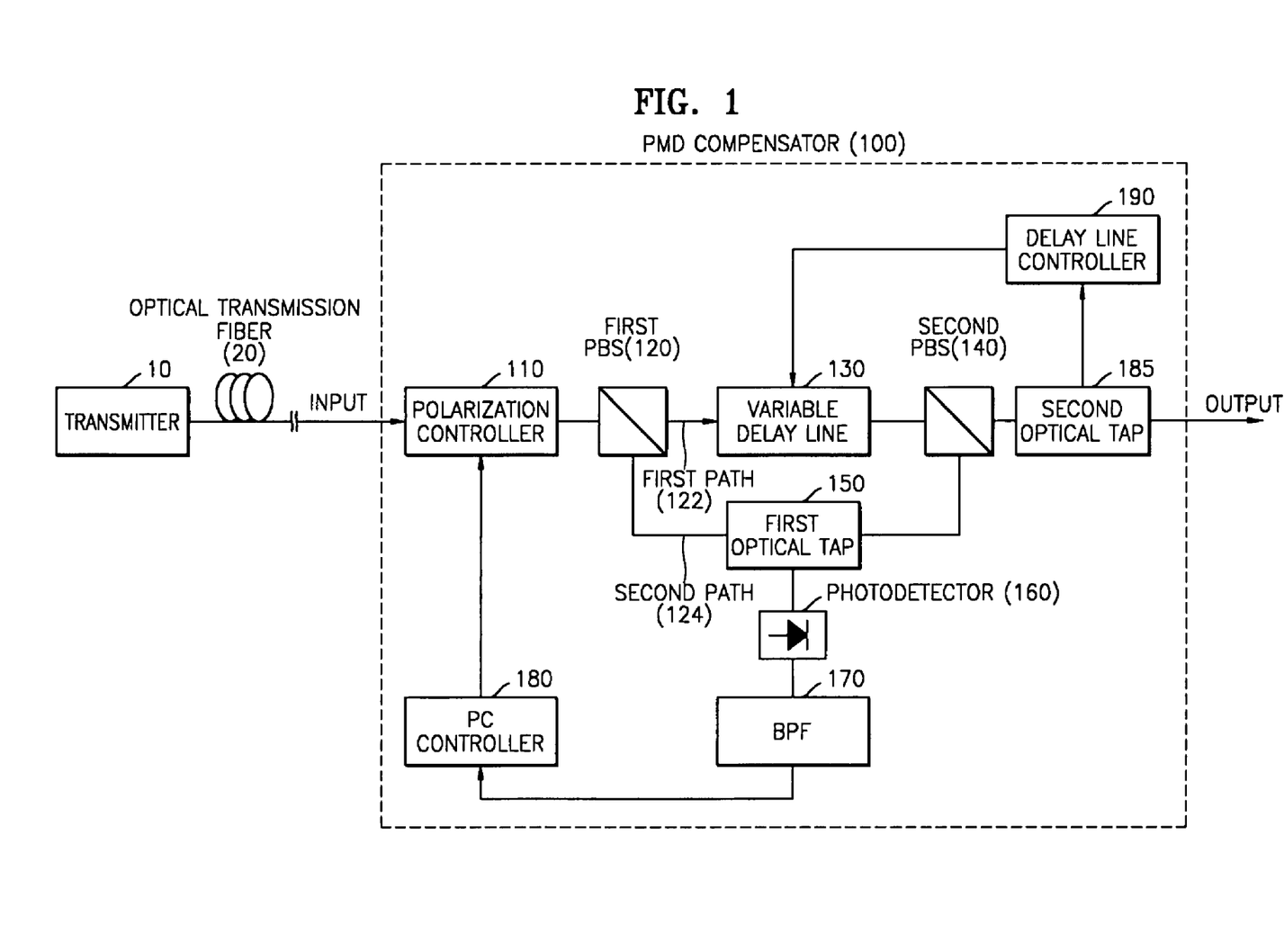
FIG. 1 is a block diagram of an automatic PMD compensator according to an embodiment of the present invention.

FIG. 1 shows an automatic PMD compensator 100 according to an embodiment of the present invention. Referring to FIG. 1, the automatic PMD compensator 100 includes a polarization controller (PC) 110, a first polarization beam splitter (PBS) 120, a variable delay line 130, a second PBS 140, a first optical tap 150, a photodetector 160, a band-pass filter (BPF) 170, a PC controller 180, and a delay line controller 190.

An optical signal transmitted from a transmitter 10 undergoes a differential time delay between two orthogonal polarization components (two PSP) occurring due to PMD when passing through an optical transmission fiber 20, and then is input to the automatic PMD compensator 100. The optical signal is distorted by experiencing the differential time delay, a polarization state of the optical signal is transformed by the PC controller 110, and the optical signal is input to the first PBS 120.

One of two orthogonal polarization components output from the first PBS 120 passes through a first path 122 and the variable delay line 130 and then is input to the second PBS 140. The other polarization component is input to the first tap 150 through a second path 124. Next, a portion of the other polarization component is diverged by the first optical tap 150, and the remaining portion of the other polarization component passes through the first optical tap 150 and then is input to the second PBS 140. The variable delay line 130 receives the polarization component from the first PBS 120 via the first path 122 and then variably introduces a time delay to the polarization component.

Light diverged by the first optical tap 150 is converted into an electric signal by the photodetector 160, passes through the BPF 170 so as to be a signal having power of a particular filtered frequency, and is input to the PC controller 180.

The two polarization components input to the second PBS 140 are coupled and then output to a second optical tap 185, the coupled polarization component is diverged by the second optical tap 185, a portion of the diverged polarization component is input to the delay line controller 190, and the remaining portion of the diverged polarization component is output as a final output signal outside the automatic PMD compensator 100. The delay line controller 190 receives the optical signal diverged by the second optical tap 185 to control the variable delay line 130 so as to remove the differential time delay between the two polarization components.

Figure 2:
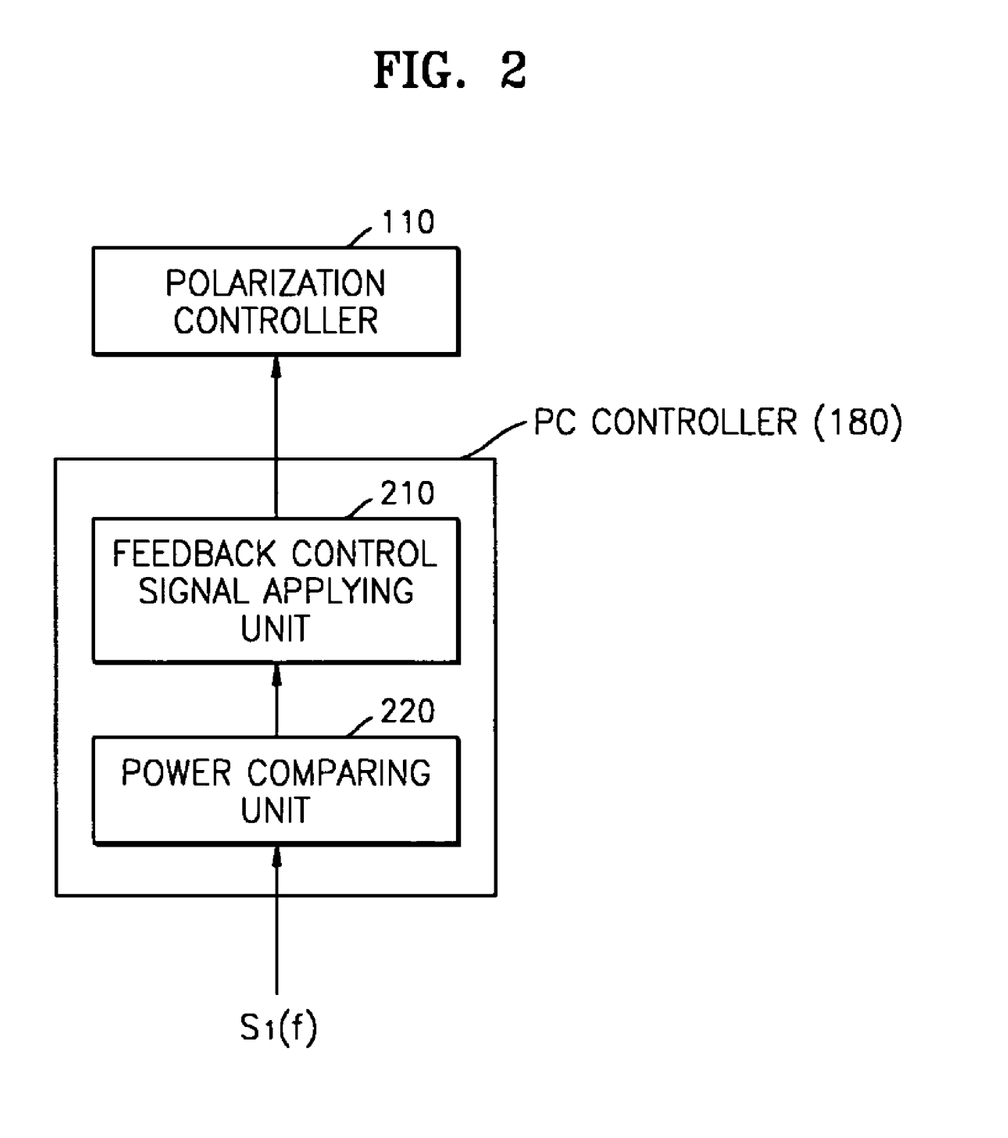
FIG. 2 is a detailed block diagram of a polarization controller (PC) controller shown in FIG. 1.

FIG. 2 shows the detailed structure of the PC controller 180. Referring to FIG. 2, an electrical power comparing unit 220 of the PC controller 180 compares a currently measured power value with a previously measured power value and then applies a feedback control signal to the PC 110 via a feedback control signal applying unit 240 so as to select a smaller power value based on the comparison result. Through this feedback process, power filtered by the BPF 170 at a particular frequency converges into a minimum value. As a result, first and second orthogonal polarization components input to the first PBS 120 are arranged parallel with two orthogonal axes of the first PBS 120, respectively, split from each other, and transmitted through the first and second paths 122 and 124. The delay line controller 190 may a delay line controller 300 shown in FIG. 3 or a delay line controller 400 shown in FIG. 4.

Figure 3:
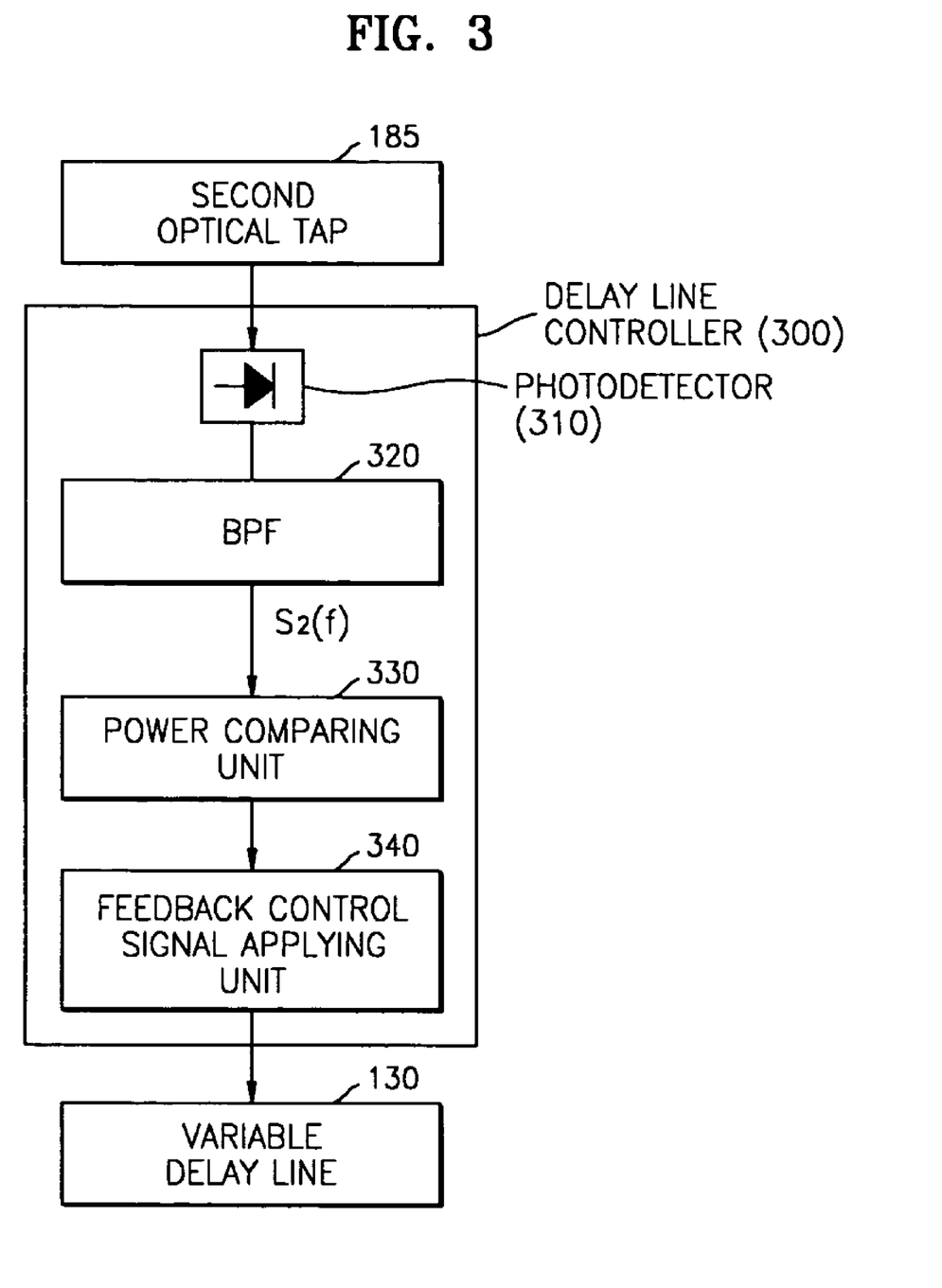
FIG. 3 is a detailed block diagram of a delay line controller 190 shown in FIG. 1.

FIG. 3 is a detailed block diagram of an embodiment of the delay line controller 190. Referring to FIG. 3, a photodetector 310 converts light input to the delay line controller 300 into an electric signal, and then a BPF 320 filters the electric signal off a particular frequency component. A power comparing unit 330 compares a power value of the currently measured signal that has passed through the BPF 320 with a power value of a previously measured signal and gives a feedback control signal applying unit 340 a command to apply a feedback control signal to the variable delay line 130 so as to select a greater power value based on the comparison result. In other words, the power comparing unit 330 stores a previously measured power value to compare it with a currently measured power value, selects a greater power value based on the comparison result, and gives the feedback control signal applying unit 340 a command to converge measured power values into a maximum power value so that the feedback control signal applying unit 340 separately outputs a control voltage signal to the PC 110.

Figure 4:
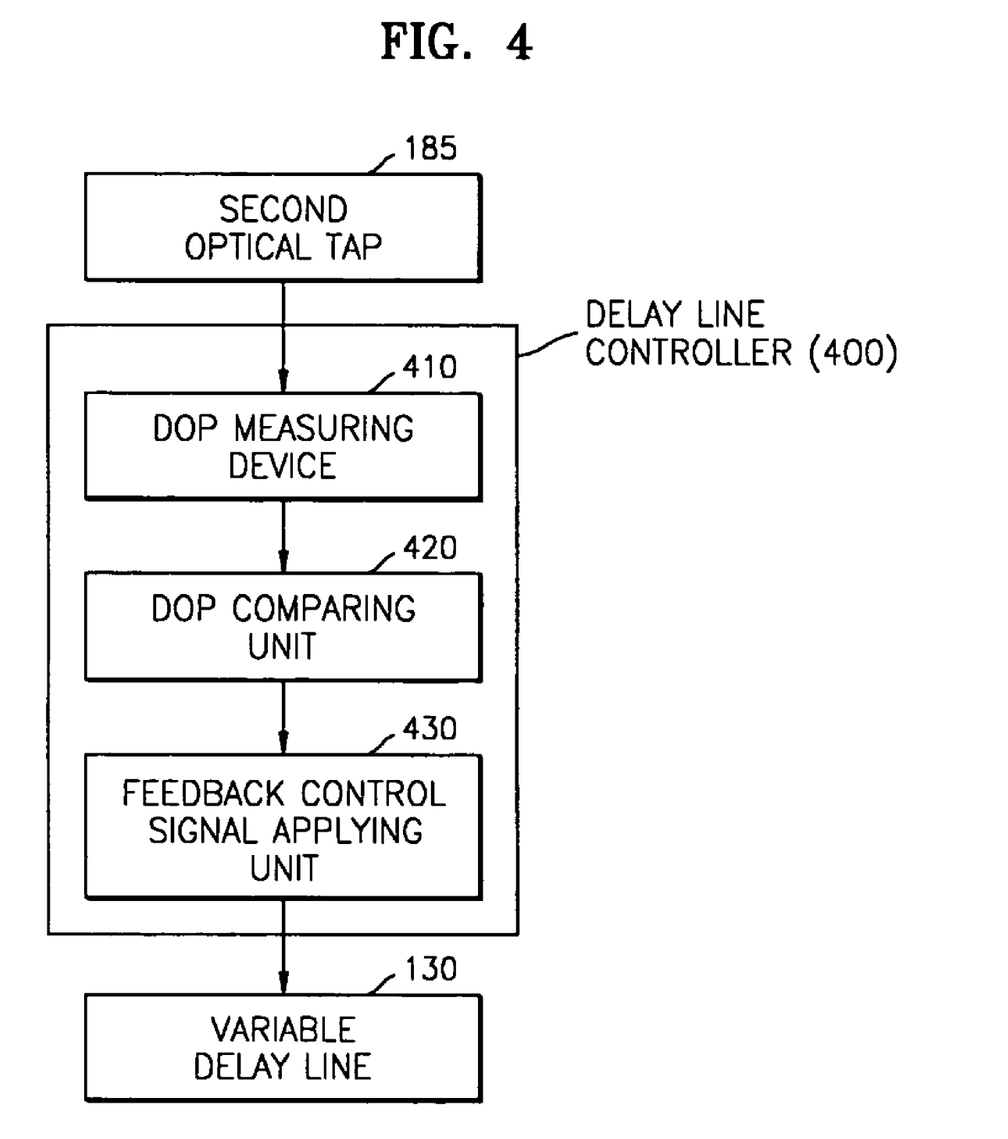
FIG. 4 is a detailed block diagram of another embodiment of the delay line controller 190.

FIG. 4 is a detailed block diagram of another embodiment of the delay line controller 190. Referring to FIG. 4, a degree of polarization (DOP) measuring device 410 measures a DOP of light input to the delay line controller 400. A DOP comparing unit 420 compares a currently measured DOP with a previously measured DOP and gives a feedback control signal applying unit 430 a command to apply a feedback control signal to the variable delay line 130 so as to select a greater DOP based on the comparison result. The repetition of this feedback process results in finally removing DGD.

A PC and a delay line repeatedly undergo a feedback process to be separately controlled according to the above-described method to thereby finally obtain a signal that has been compensated for.

The principle of compensating for PMD through a feedback will now be explained in detail.

As described above, a fast axis and a slow axis, i.e., two orthogonal PSP, exist in an optical transmission fiber. The two PSP are written as PSP+ and PSP−, respectively. Let us assume that a light source of monochromatic light is input to the optical transmission fiber via an external modulator. The incident light experiences a differential time delay by DGG $\tau_f$ between the two PSP, is input to the PC 110 through the optical transmission fiber, is diverged by the first optical tap 150 in the second path 122 of the first PBS 120, and is input to the photodetector 160.

$$S_1(\omega) = \quad (1)$$
$$K_1^2 a_0^2 I_0^2 \{(a^4 + b^4 + 2a^2 b^2 \cos\omega\tau_f)|F(\omega)|^2 + 4a^2 b^2 |H(\omega)|^2 \cos^2\omega_0\tau_f - 4ab\cos\omega_0\tau_f \cdot \text{Re}[(a^2 \exp(i\omega\tau_f) + b^2) F(\omega) H*(\omega)]\}$$

wherein $F(\omega)$ and $H(\omega)$ are Fourier Transforms of $\cos^2(\Delta\phi(t)/2)$ and $\cos(\Delta\phi(t+\tau)/2)\cos(\Delta\phi(t)/2)$, $a=\cos\theta_0 \cos\theta$, and $b=\sin\theta_0 \sin\theta$. $\Delta\phi(t)(=\pi[1-f(t)])$ denotes a phase difference between two waveguides of the external modulator, $\omega_0$ denotes an optical frequency, $a_0$ denotes loss of the optical transmission fiber, $K_1$ denotes a coupling ratio of the first optical tap 150, $\theta_0$ denotes an angle of the fast axis (PSP+) with polarization of light input to the optical transmission fiber, $\theta$ denotes an angle of PSP+ of light output via the optical transmission fiber with x-axis of a PBS, $I_0$ denotes the intensity of a light source transmitted from a transmitter, and $\omega=2\pi f$.

Light loss should be added to the first path 122 by $K_1$ so that light loss in the first path 122 equals light loss in the second path 124. For this, actual insertion loss of the variable delay line 130 may be used or a variable attenuator may be disposed in the first path 122 or the second path 124 to adjust the light losses in the first path 122 and the second path 124. Let us assume that insertion losses of other optical elements of the automatic PMD compensator 100 are ignorable.

In general, if a pseudo random bit sequence (PRBS) NRZ data pulse signal having a bit time of T is input, $F(\omega)$ has a sinc function and a frequency f has a zero value at $f=n/T$ ($n=1, 2, 3, \ldots$). When $S_1(\omega)$ converges into a minimum value in $\theta=n\pi/2(n=0, 1, 2, \ldots)$, i.e., when $\theta=n\pi/2(n=0, 1, 2, \ldots)$, two PSP components are aligned parallel with two orthogonal axes of a PBS to be split.

This requires a feedback process of comparing a currently measured value of $S_1(\omega)$ with a previously measured value of $S_1(\omega)$ to apply a feedback voltage to the PC 110 so as to select a smaller value based on the comparison result. When the feedback process is repeated to follow PSP, $\theta=n\pi/2(n=0, 1, 2, \ldots)$. As a result, two PSP components are split by the PBS and then proceed through different paths.

Figure 5:
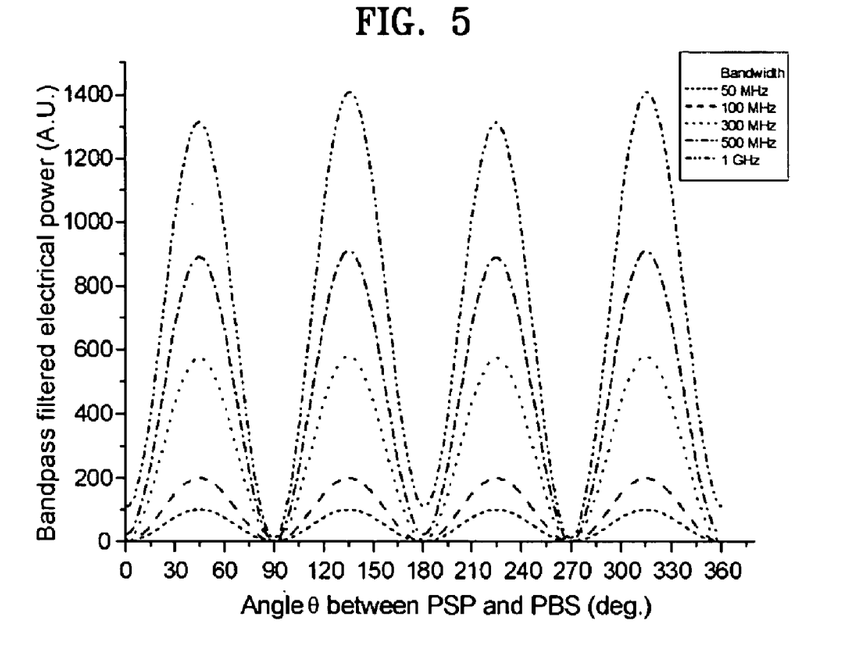
FIG. 5 is a graph showing a variation in band-pass filtered electrical power at a 10 GHz frequency in each bandwidth depending on variations in an angle between PSP and a polarization beam splitter in a band-pass filter shown in FIG. 1.

FIG. 5 is a graph showing a variation in band-pass filtered electrical power at a 10 GHz frequency in each bandwidth depending on variations in an angle between PSP and a polarization beam splitter in a band-pass filter shown in FIG. 1.

Let us assume that a random 10 Gb/s NRZ data pulse stream f(t) is "01011100101100" at $-7T \leq t \leq 7T$ to calculate an electrical spectrum. The electrical spectrum of the NRZ data stream is calculated at the frequency of 10 GHz using Equation 1, and then power is expressed with a function of θ depending on a bandwidth of the BPF as shown in FIG. 5. Here, $\theta_0=n\pi/2$ and $\tau f=30$ ps.

Referring to FIG. 5, $S_1(\omega)$ can converge into different minimum values at $\theta=n\pi/2(n=0, 2, 4, \ldots)$ and $\theta=n\pi/2(n=1, 3, 5, \ldots)$. This is because of differential strengths of two PSP signal components and an effect of the bandwidth of the BPF. If an input signal is an RZ data pulse signal having a pulse width ratio of 0.5 to bit time, a monitoring frequency for following PSP signals $f=2n/T$ $(n=1, 2, 3, \ldots)$. Such a real-time PSP following method keeps two orthogonal PSP components to be always separated during PMD varying with time.

The two PSP components coupled by the second PBS 140 are diverged by the second optical tap 185 and then input to the delay line controller 190. In a case where the delay line controller 190 is the delay line controller 300 shown in FIG. 3, light input from the second optical tap 185 to the photodetector 310 is converted into an electric signal to have an electric spectrum calculated as in Equation 2.

$$S_2(\omega) = k_2^2(1-K_1)^2 a_0^2 I_0^2 [1 - \sin^2 2\theta_0 \sin^2(\omega\tau/2)] \cdot |F(\omega)|^2 \quad (2)$$

wherein τ represents the sum of DGD $\tau_f$ generated in the optical transmission fiber and DGD $\tau_c$ generated by the automatic PMD compensator 100, i.e., the total DGD, $\omega=2\pi f$, and $K_2$ denotes a coupling rate of the second optical tap 185.

Figure 6:
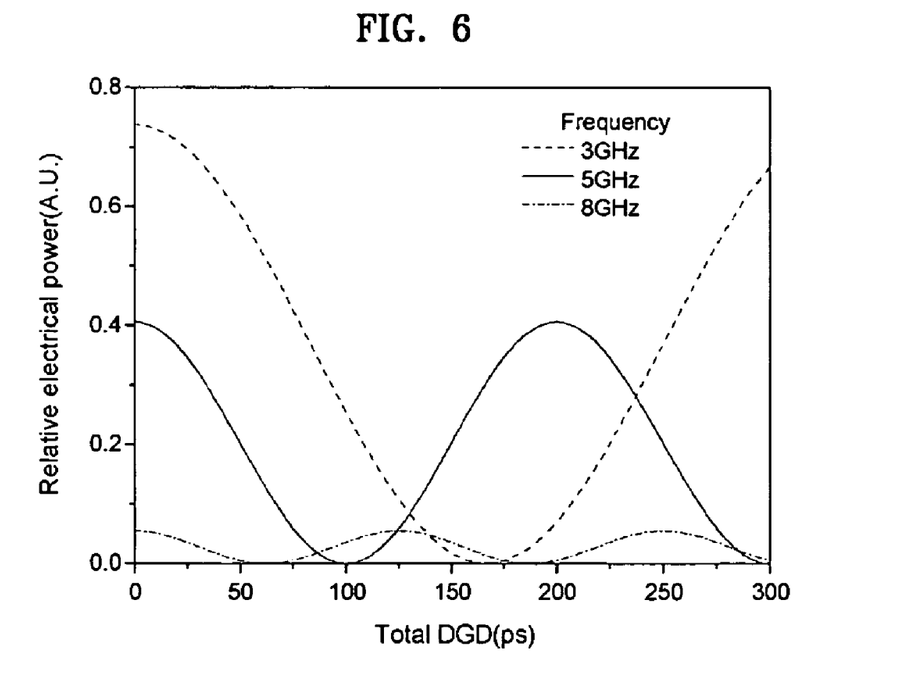
FIG. 6 is a graph showing electrical power components of 3, 5, 7 GHz frequencies of an electrical power spectrum output from a photodetector of the delay line controller shown in FIG. 3 based on variations in a total DGD.

FIG. 6 is a graph showing power components of 3, 5, 7 GHz frequencies of the electrical spectrum output from the photodetector 310 of the delay line controller 300 shown in FIG. 3 depending on variations in the total DGD. In other words, FIG. 6 expresses $S_2(\omega)$ for a particular frequency as a function of τ using the proportion of $F(\omega)$ to sin $c(\pi f T)$ (T is a bit time) for a random PRBS NRZ pulse signal. The DGD τ should be zero to obtain a compensated signal. Here, $S_2(\omega)$ shows a maximum value at the particular frequency. That is, a currently measured value of $S_2(\omega)$ is compared with a previously measured value of $S_2(\omega)$ at a particular frequency to apply a feedback voltage to the variable delay line 190 so as to select a greater value based on the comparison result. This feedback process is repeated so that $S_2(\omega)$ converges into the maximum value. Since the DGD τ becomes zero, a compensation signal can be obtained.

$S_2(\omega)$ has the maximum value at $\pi=n/f$ $(n=1, 2, 3, \ldots)$ as when $\tau=0$. In other words, as can be seen in FIG. 6, when a monitoring frequency is 5 GHz, $S_2(\omega)$ has the maximum value at $\tau=200$ ps. Thus, $S_2(\omega)$ can converge into $\tau=200$ ps through the feedback process. In order to prevent the generation of such an ambiguous signal, the total DGD τ is confined to 100 ps or less even when the monitoring frequency is 5 GHz. The range of total DGD τ varies according to the monitoring frequency.

As can be seen in FIG. 6, the adjustable range of the total DGD τ increases with a decrease in the monitoring frequency. $F(\omega)$ of Equation 2 is zero at $f=n/T$ $(n=1, 2, 3, \ldots)$ when selecting the monitoring frequency. Thus, $S_2(\omega)$ is always zero although the total DGD τ varies, which disables the DGD to be followed. Therefore, the monitoring frequency must avoid $f=n/T$.

In a case where the delay line controller 190 is the delay line controller 400 shown in FIG. 4, the DOP comparing unit 420 measures DOP of input light, compares the measured DOP with previously measured DOP, and commands the feedback control signal applying unit 430 to apply a feedback voltage to the variable delay line 130 so as to select the greater value based on the comparison result. In a case of the PRBS NRZ data pulse signal, DOP increases so that the total DGD τ approaches zero. Accordingly, when DOP is maximum, the total DGD τ is zero, thereby obtaining the compensation signal.

Figure 7:
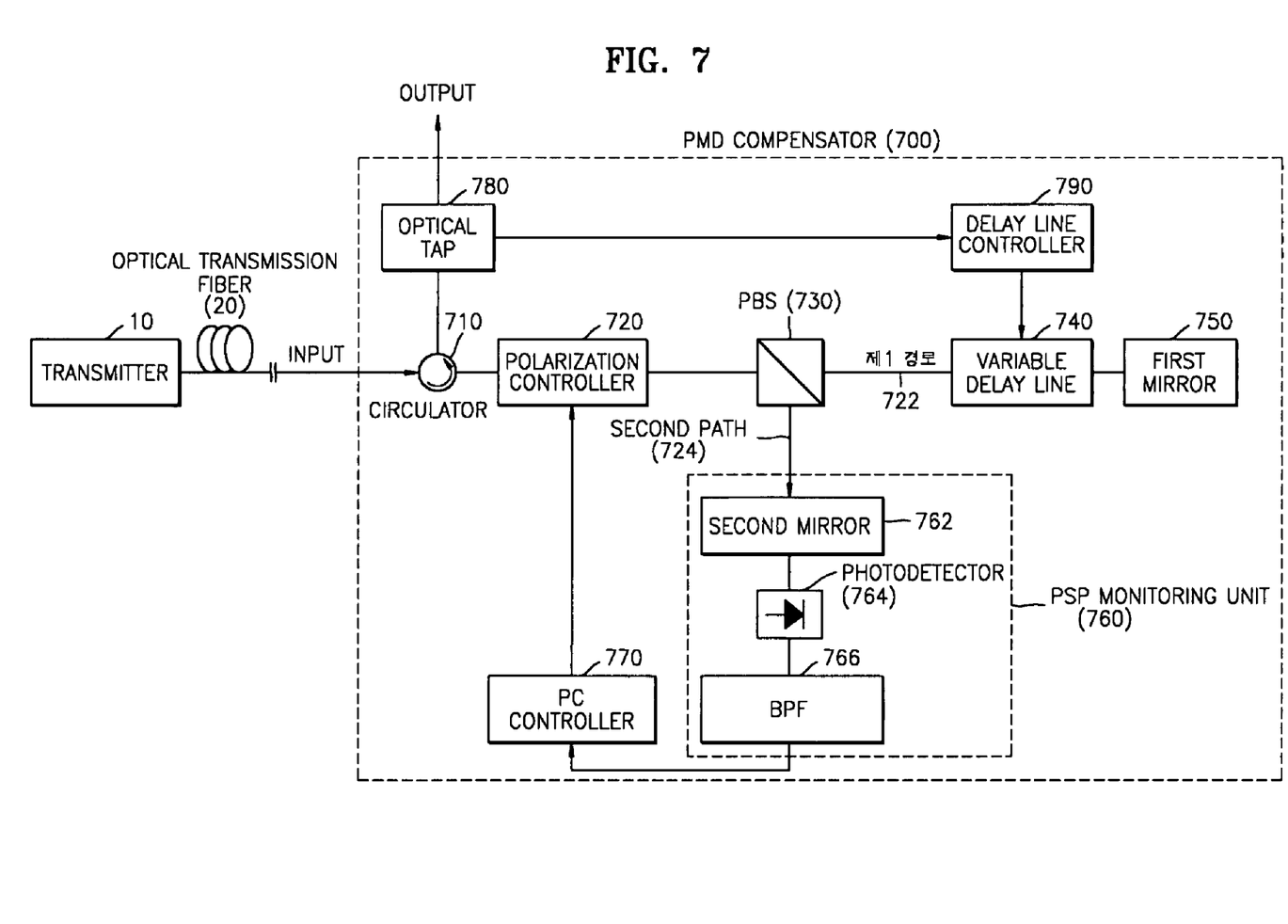
FIG. 7 is a block diagram of an automatic PMD compensator according to another embodiment of the present invention.

FIG. 7 is a block diagram of an automatic PMD compensator 700 according to another embodiment of the present invention. Referring to FIG. 7, an optical signal transmitted from a transmitter 10 is distorted by PMD occurring when passing through an optical transmission fiber 20 and then input to a PC 720 via a circulator 710. PSP of the optical signal is transformed by a PC 720, and then the optical signal is input to a PBS 730. One of two orthogonal PSP components output from the PBS 730 is transmitted to a variable delay line 740 through a first path 722, and the other is transmitted to a PSP monitoring unit 760 through a second path 724.

The polarized light delayed by the variable delay line 740 is reflected from a first mirror 750, re-experiences a time delay through the variable delay line 740, and is transmitted to the PC 720 via the PBS 730. A portion of the polarized light input to the PSP monitoring unit 760 is reflected from a second mirror 762, and the remaining portion of the polarized light is transmitted through the second mirror 762. The reflected light is transmitted to the polarization controller 720 through the PBS 730, and the transmitted light is converted into an electric signal by a photodetector 764 and then input to a PC controller 770 via a BPF 766. The structure and operation of the PC controller 770 is identical to those of the PC controller 180 described in the previous embodiment with reference to FIG. 1.

The two PSP components, which have reflected from the first and second mirrors 750 and 762, respectively, and transmitted to the PC 720 via the PBS 730, are coupled and then input to an optical tap 780 via circulator 710. The coupled PSP component is diverged by the optical tap 780, a portion of the diverged PSP component is input to a delay line controller 790, and the remaining portion of the diverged PSP component is output as a final output signal outside the automatic PMD compensator 700. Like the PC controller 770, the structure and operation of the delay line controller 790 are equal to those of the delay line controller 190 described in the previous embodiment.

The present embodiment has suggested an automatic PMD compensator using a circulator, a PC, and a Michelson interferometer type structure. A PC controller for controlling PSP and a delay line controller for controlling DGD have the same structures and principles as in the previous embodiment. Accordingly, like the Mach-Zehnder interferometer type compensator 100, the Michelson interferometer type compensator 700 according to the present embodiment can perform control of PSP separately from control of time delay. As a result, compensation time can be sharply reduced and a feedback process can be repeated to obtain a compensated signal.

Figure 8:
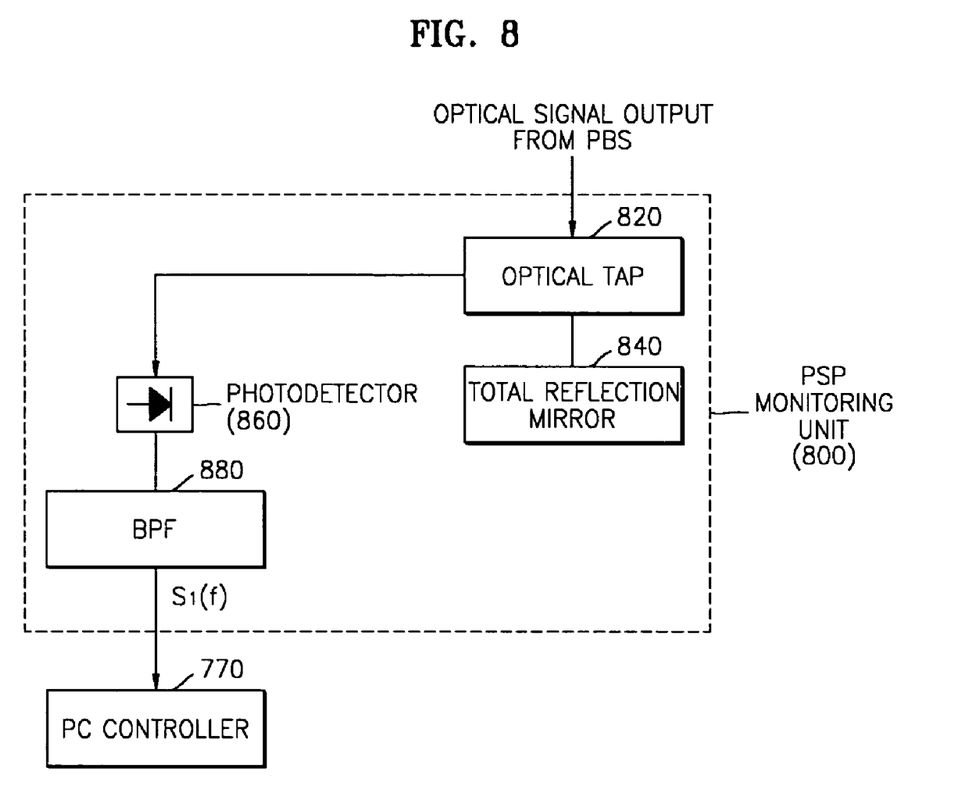
FIG. 8 is a block diagram of another embodiment of a PSP monitor shown in FIG. 7.

FIG. 8 is a block diagram of another embodiment of the PSP monitoring unit 760 shown in FIG. 7. The PSP monitoring unit 760 shown in FIG. 7 may have the same structure as a PSP monitoring unit 800 shown in FIG. 8. In the PSP monitoring unit 800, instead of the second mirror 762 of FIG. 7 that is a half mirror, an optical tap 820 diverges light for monitoring PSP, and a total reflection mirror 840 reflects the remaining light component. The diverged light is transmitted to the PC controller 770 via a photodetector 860 and a BPF 880.

Figure 9:
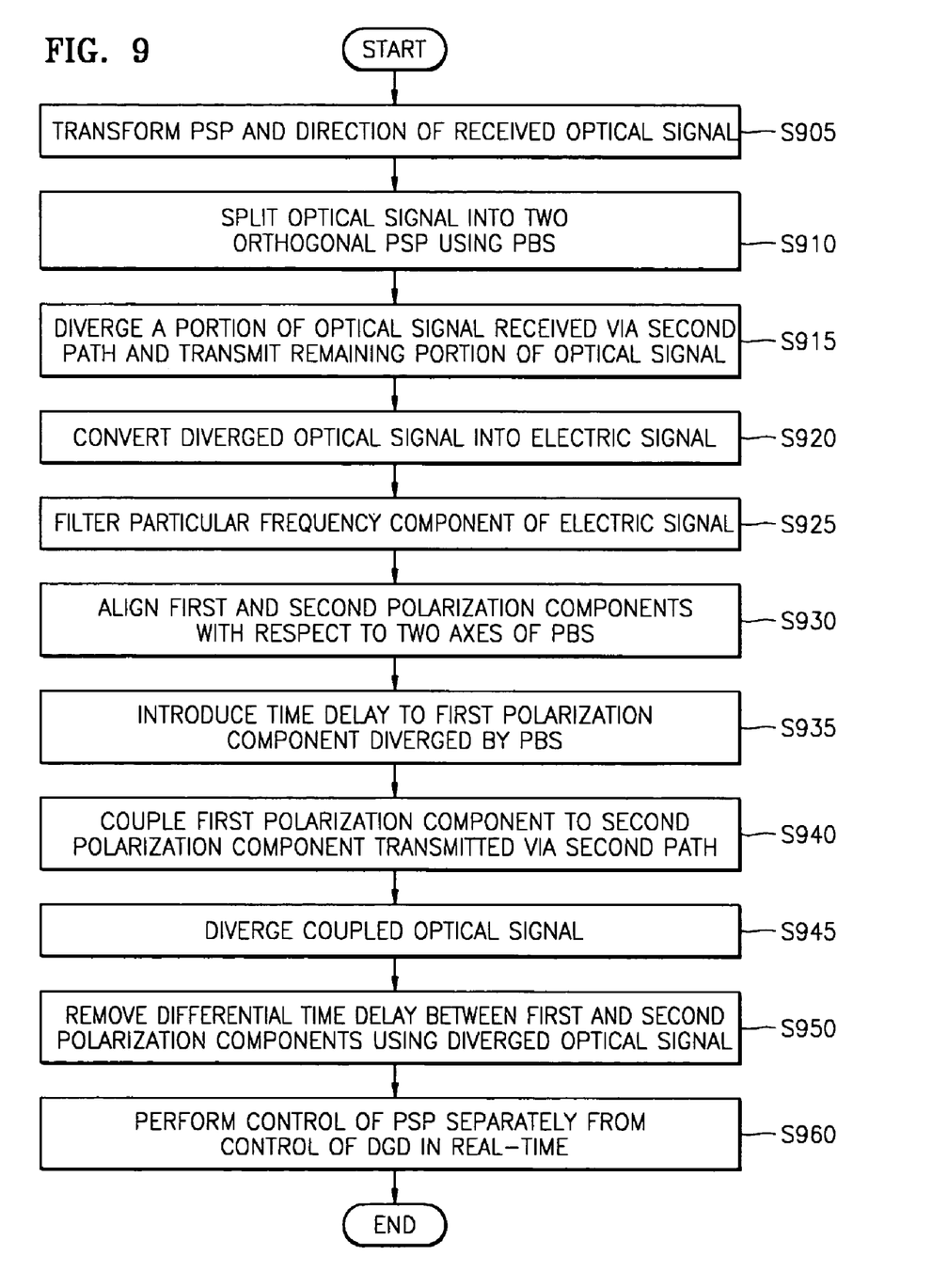
FIG. 9 is a flowchart of a method of compensating for PMD using the automatic PMD compensator shown in FIG. 1.

FIG. 9 is a flowchart of a method of compensating for PMD using the automatic PMD compensator 100 shown in FIG. 1. Here, the method separately performs arranging first and second polarization components of a received optical signal with respect to two orthogonal axes of a PBS using power information of an optical signal transmitted to the second path 124 to separate the first and second polarization components, and receiving the separated first and second polarization components to remove a differential time delay between the first and second polarization components.

In step S905, PSP and direction of an optical signal received via an optical transmission fiber are transformed. In step S910, the transformed optical signal is split and then transmitted to orthogonal first and second paths of the first PBS 120, respectively.

In step S915, a portion of the optical signal received via the second path is diverged and the remaining portion of the optical signal is transmitted. In step S920, the diverged optical signal is converted into an electric signal, and in step S925, a particular frequency component is filtered from an electrical spectrum of the electric signal. In step S930, the first and second polarization components of the input optical signal are controlled using the filtered power to be aligned with respect to two axes of a PBS.

In step S935, an optical signal of the first polarization component split by a first PBS is received to variably introduce a time delay to the optical signal of the first polarization component. In step S940, the optical signal of the first polarization component is coupled to an optical signal of the second polarization component transmitted via the second path and then output.

In step S945, a portion of the coupled optical signal is diverged, the remaining portion of the coupled optical signal is transmitted, and a differential time delay between the first and second polarization components is eliminated using the diverged optical signal.

In step S960, control of PSP is in real-time performed separately from control of DGD to adapt to PMD varying with time so that a compensated signal is always output.

Figure 10:
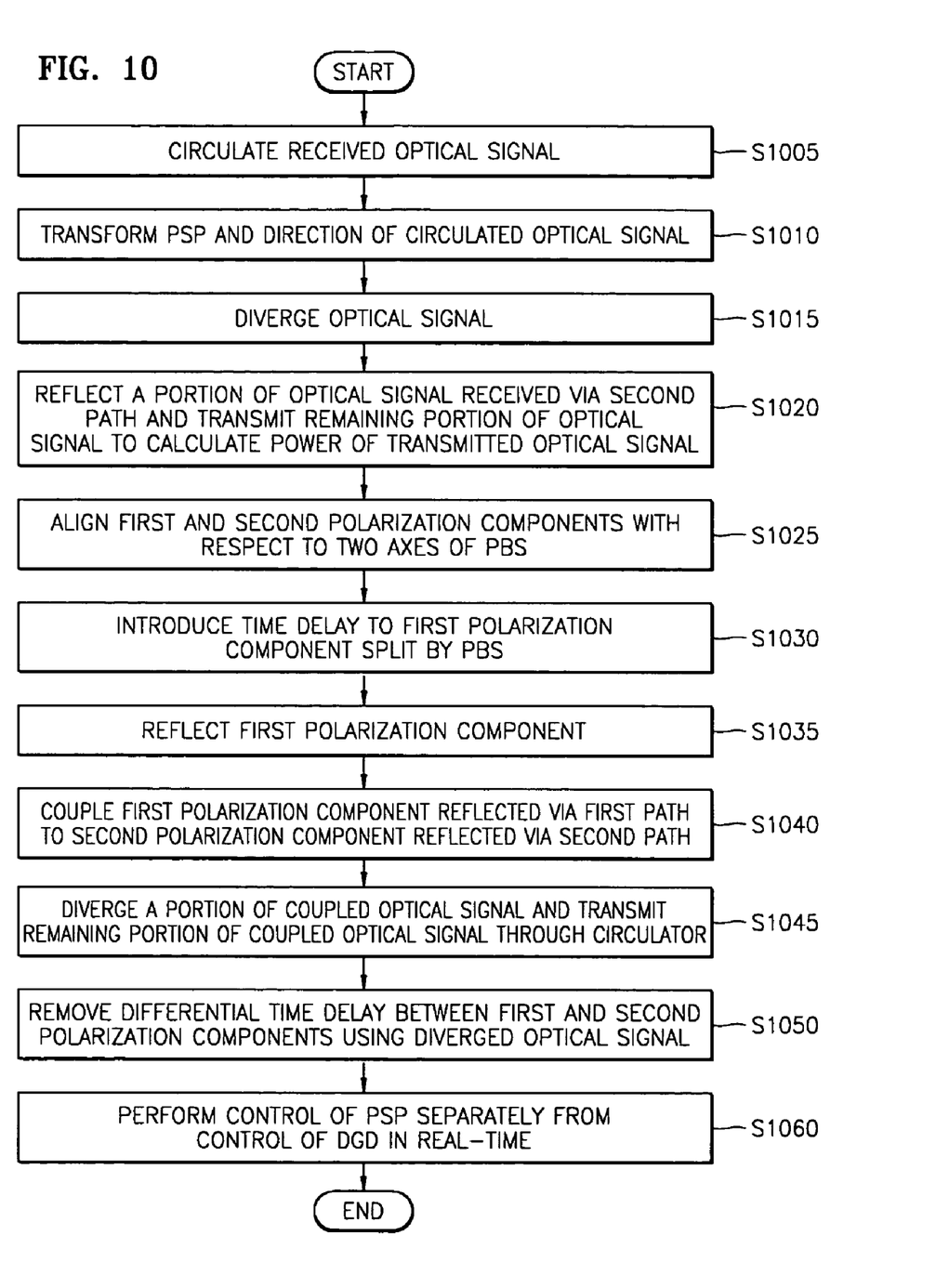
FIG. 10 is a flowchart of a method of compensating for PMD using the automatic PMD compensator shown in FIG. 7.

FIG. 10 is a flowchart of a method of compensating for PMD using the automatic PMD compensator shown in FIG. 7.

In step S1005, an optical signal received via an optical transmission fiber circulates. In step S1010, PSP and direction of the circulated optical signal are transformed. In step S1015, the transformed optical signal is split and then transmitted to first and second paths which are orthogonal with respect to the PBS 730. In step S1020, a portion of the optical signal received via the second path is reflected, the remaining portion of the optical signal is transmitted, and power of the transmitted optical signal is calculated. In step S1025, the first and second polarization components are controlled using the calculated power value to be aligned with respect to two orthogonal axes of the PBS 730.

In step S1030, an optical signal of the first polarization component, which has diverged by the PBS 730 and output via the first path, is received to variably introduce a time delay to the optical signal of the first polarization component. In step S1035, the optical signal of the first polarization component is reflected. In step S1040, the reflected optical signal of the first polarization component is coupled to an optical signal of the second polarization component reflected via the second path. The coupled optical signal undergoes the circulation process in step S1005, and then in step S1045, the coupled optical signal is diverged.

In step S1050, a differential time delay between the first and second polarization components is removed using the diverged optical signal.

In step S1060, control of PSP is in real-time performed separately from control of DGD to adapt to PMD varying with time so that a compensated signal is always output.

As described above, according to the above-described embodiments of the present invention, control of PSP can be performed separately from control of DGD to considerably reduce compensation time for PMD and automatically adapt to PMD varying with time. As a result, PMD can be compensated for at a high speed.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A polarization mode dispersion compensator comprising:
   a separator that aligns orthogonal first and second polarization components of a received optical signal with respect to two orthogonal axes of a polarization beam splitter using optical signal information output via a second path of a first path and the second path of the two outputs of the polarization beam splitter, splits the first and second polarization components, and transmits the first polarization component via the first path and the second polarization component via the second path;
   a differential time delay remover that receives the first and second polarization components that has been split to remove a differential time delay between the first and second polarization components; and
   a first optical tap that receives the second optical signal via the second path;
   a photodetector that converts the optical signal diverged by the first optical tap into an electric signal; and
   a band-pass filter that filters a particular frequency component of an electrical spectrum of the electric signal.

2. The polarization mode dispersion compensator of claim 1, wherein the separator comprises:
   a polarization controller (PC) that transforms principal states of polarization of the optical signal received via an optical transmission fiber;
   a first polarization beam splitter that splits the transformed optical signal into orthogonal first and second polarization components, and transmits an optical signal of the first optical signal via the first path and an optical signal of the second optical signal via the second path; and
   a PC controller that controls the PC using a power value of the filtered frequency component so that the first and second polarization components of the received optical signal are aligned with respect to two axes of the first polarization beam splitter, the first polarization component is transmitted via the first path, and the second polarization component is transmitted via the second path;
   wherein the first optical tap diverges a portion of the second optical signal, and transmits the remaining portion of the second optical signal.

3. The polarization mode dispersion compensator of claim 2, wherein the PC controller comprises:
   a power comparing unit that compares a power value of the electric signal output from the band-pass filter with a previously measured power value; and a feedback control signal applying unit that applies a feedback control signal to the PC so as to select a smaller value based on the comparison result.

4. The polarization mode dispersion compensator of claim 2, wherein the differential time delay remover comprises:
   a variable delay line that receives the optical signal of the first polarization component diverged by the first polarization beam splitter and then variably introduces a time delay to the optical signal of the first polarization component;
   a second polarization beam splitter that couples and outputs the optical signal of the first polarization component and the optical signal of the second polarization component transmitted through the first optical tap;
   a second optical tap that diverges a portion of the coupled optical signal output from the second polarization beam splitter and transmits the remaining portion of the coupled optical signal; and
   a delay line controller that controls the variable delay line so as to remove the differential time delay between the first and second polarization components using the optical signal diverged by the second optical tap.

5. The polarization mode dispersion compensator of claim 4, wherein the PC controller comprises:
   a power comparing unit that compares a power value of the electric signal output from the band-pass filter with a previously measured power value; and
   a feedback control signal applying unit that applies a feedback control signal to the PC so as to select a smaller value based on the comparison result.

6. The polarization mode dispersion compensator of claim 4, wherein the delay line controller comprises:
   a photodetector that converts the optical signal diverged by the second optical tap into an electric signal;
   a band-pass filter that filters a predetermined electrical spectrum component of the electric signal;
   a power comparing unit that compares a power value of the filtered electric signal with a previously measured power value; and
   a feedback control signal applying unit that applies a feedback control signal to the variable delay line so as to select a greater value based on the comparison result.

7. The polarization mode dispersion compensator of claim 4, wherein the delay line controller comprises:
   a degree of polarization measuring unit that measures a degree of polarization of the optical signal diverged by the second optical tap;
   a degree of polarization comparing unit that compares the measured degree of polarization with a previously measured degree of polarization; and
   a feedback control signal applying unit that applies a feedback control signal to the variable delay line so as to select a greater value based on the comparison result.

8. The polarization mode dispersion compensator of claim 1, wherein the separator comprises:
   a circulator that circulates the optical signal received via the optical transmission fiber;
   a PC that transforms principle states of polarization and direction of the optical signal output from the circulator;
   a polarization beam splitter that splits the transformed optical signal into orthogonal first and second polarization components, and transmits an optical signal of the first polarization component via the first path and an optical signal of the second polarization component via the second path;
   a principal states of polarization (PSP) monitoring unit that receives the optical signal via the second path, reflects a portion of the optical signal, and transmits the remaining portion of the optical to calculate a power of the transmitted portion of the optical; and
   a PC controller that controls the PC using the calculated power value so that the first and second polarization components are aligned with respect to two orthogonal axes of the polarization beam splitter, the first polarization component is transmitted via the first path, and the second polarization component is transmitted via the second path.

9. The polarization mode dispersion compensator of claim 8, wherein the PSP monitoring unit comprises:
   a mirror that totally reflects a first optical signal; wherein the first optical tap diverges the optical signal into first and second optical signals, the photodetector converts a second optical signal into an electric signal, the band-pass filter that filters a predetermined frequency component of the electrical spectrum of the electrical signal.

10. The polarization mode dispersion compensator of claim 8, wherein the PSP monitoring unit comprises:
    a half mirror that receives the optical signal via the second path, reflects a portion of the received optical signal, and transmits the remaining portion of the received optical signal.

11. The polarization mode dispersion compensator of claim 8, wherein the differential time delay remover comprises:
    a variable delay line that receives the optical signal of the first polarization component output from the polarization beam splitter and then variably introduces a time delay to the optical signal of the first polarization component;
    a mirror that reflects the optical signal of the first polarization component; and
    a delay line controller that controls the variable delay line using the optical signal diverged by the optical tap to remove a differential time delay between the first and second polarization components,
    wherein the first optical tap diverges the coupled optical signal which is obtained by coupling the optical signal of the first polarization component reflected from the mirror to the optical signal of the second polarization component reflected from the PSP monitoring unit using the polarization beam splitter and transmitting the coupled optical signal through the PC and the circulator.

12. The polarization mode dispersion compensator of claim 11, wherein the delay line controller comprises:
    a power comparing unit that compares a power value of the electrical signal with a previously measured power value; and
    a feedback control signal applying unit that applies a feedback control signal to the variable delay line so as to select a greater value based on the comparison result;
    wherein the band-pass filter filters a predetermined electrical spectrum of the electric signal.

13. The polarization mode dispersion compensator of claim 11, wherein the delay line controller comprises:
    a degree of polarization measuring unit that measures a degree of polarization of the optical signal diverged by the optical tap;
    a degree of polarization comparing unit that compares the measured degree of polarization with a previously measured degree of polarization; and a feedback control signal applying unit that applies a feedback control signal to the variable delay line so as to select a greater value based on the comparison result.

14. A method of compensating for polarization mode dispersion, comprising:

aligning orthogonal first and second polarization components of a received optical signal with respect to two orthogonal axes of a polarization beam splitter using optical signal information output via a second path of a first path and the second path of the two outputs of the polarization beam splitter, splitting the first and second polarization components, and transmitting the first polarization component via the first path and the second polarization component via the second path;

receiving a second optical signal via the second path, diverging a portion of the second optical signal, and transmitting the remaining portion of the second optical signal;

converting the diverged optical signal into an electric signal;

filtering a particular frequency component of an electrical spectrum of the electric signal; and receiving the first and second polarization components that have been split to remove a differential time delay between the first and second polarization components.

15. The method of claim 14, wherein the splitting of the first and second polarization components comprises:

transforming principal states of polarization of the optical signal received via an optical transmission fiber;

splitting the transformed optical signal into orthogonal first and second polarization components, and transmitting an optical signal of the first optical signal via the first path and an optical signal of the second optical signal via the second path; and aligning the first and second polarization components of the received optical signal with respect to two axes of a polarization beam splitter, using a power value of the filtered frequency component, and transmitting the first polarization component via the first path and the second polarization component via the second path.

16. The method of claim 14, wherein the removal of the differential delay time comprises:

receiving the optical signal of the first polarization component diverged by the polarization beam splitter and then variably introducing a time delay to the optical signal of the first polarization component;

coupling and outputting the optical signal of the first polarization component to which the time delay is introduced and the optical signal of the second polarization component transmitted via the second path;

diverging a portion of the coupled optical signal output from the second polarization beam splitter and transmitting the remaining portion of the coupled optical signal; and removing the differential time delay between the first and second polarization components using the diverged optical signal.

17. The method of claim 14, wherein the splitting of the first and second polarization components comprises:

circulating the optical signal received via an optical transmission fiber;

transforming principle states of polarization and direction of the circulated optical signal;

splitting the transformed optical signal into orthogonal first and second polarization components and transmitting an optical signal of the first polarization component via the first path and an optical signal of the second polarization component via the second path;

receiving the optical signal via the second path, reflecting a portion of the optical signal, and transmitting the remaining portion of the optical to calculate a power of the transmitted portion of the optical; and aligning the first and second polarization components with respect to two orthogonal axes of the polarization beam splitter, using the calculated power value, and transmitting the first polarization component via the first path and the second polarization component via the second path.

18. The method of claim 14, wherein the removal of the differential delay time comprises:

receiving the optical signal of the first polarization component output from the polarization beam splitter and then variably introducing a time delay to the optical signal of the first polarization component;

reflecting the optical signal of the first polarization component to which the time delay is introduced;

coupling the reflected optical signal of the first polarization component to the optical signal of the second polarization component reflected via the second path, circulating the coupled optical signal, and diverging the coupled optical signal; and removing a differential time delay between the first and second polarization components using the diverged optical signal.

* * * * *